Aug. 8, 1961     G. L. KITSON     2,995,077
VENTILATING SYSTEM

Filed Sept. 30, 1957     2 Sheets-Sheet 1

Inventor
Gerald L. Kitson
By
Attorney

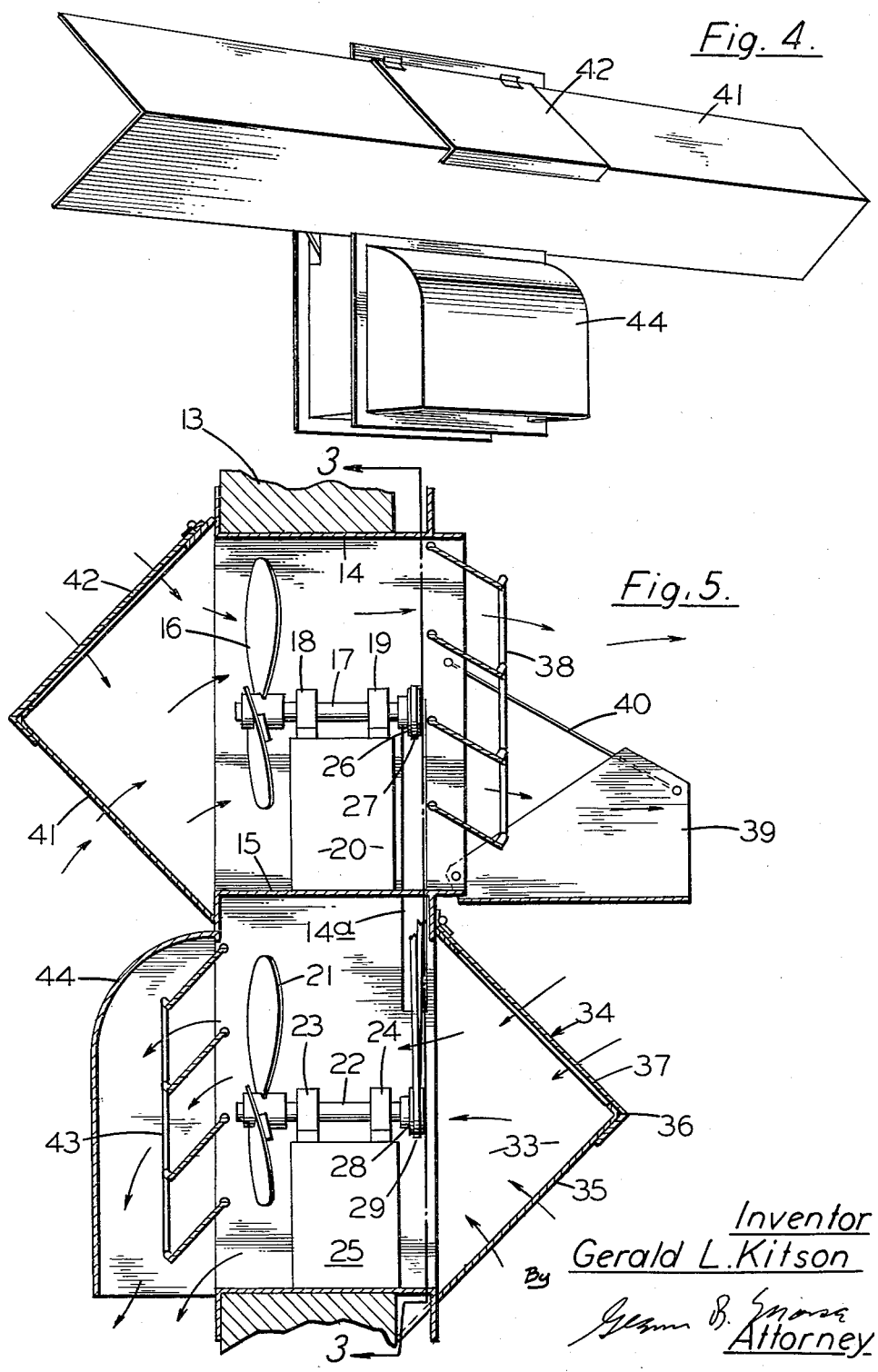

United States Patent Office 2,995,077
Patented Aug. 8, 1961

2,995,077
VENTILATING SYSTEM
Gerald L. Kitson, 9709 Belding Road NE.,
Rockford, Mich.
Filed Sept. 30, 1957, Ser. No. 686,954
2 Claims. (Cl. 98—33)

This invention relates to the construction of ventilating systems, and has been developed primarily as a result of the problems encountered in ventilating poultry houses. Conditions frequently exist in which it becomes desirable to exhaust the air within the poultry houses, and also to bring into the building a desired amount of fresh air. The outside conditions of temperature and humidity are frequently responsible for the changes in the needs within the building, and any ventilating system used in such a structure should be readily reversible and provided with intake and exhaust arrangements sufficiently spaced apart so that the net effect of the operation of the unit will do more than merely induce a local change of air in the immediate vicinity of the unit.

The present invention provides a reversible ventilating system with a remote positioning of the intake and exhaust, and provides these features with the utmost simplicity of construction. An opening is formed in the wall of the building, and the flow-inducing portion of the equipment is positioned preferably within this opening. Flow is induced by a pair of fans placed preferably one above the other and rotating on axes generally perpendicular to the plane of the wall. A housing for the fan isolates one unit from the other, and provides an opening for belts to supply power to the fans. Access doors are disposed in such a manner so that the belts (or at least one of them) are readily reversible. With this arrangement, the fans may be operated in push-pull relationship, or both may be operated to induce flow in the same direction. Either of these arrangements can operate in either direction.

It is preferable that ducts be associated with at least the inside of the wall so that the point of communication of the flow from each of the two fans with the interior of the building is sufficiently far removed to avoid a mere generation of local turbulence. The portion of the housing associated with one of the fans is preferably placed in communication with a duct extending laterally in both directions, and formed by a pair of panels which are each connected to the wall and to each other to form a duct of triangular cross-section.

Figure 1:
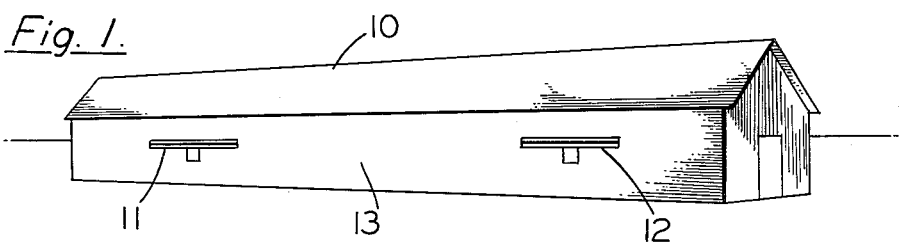

The several features of the invention will be discussed in further detail through an analysis of the particular embodiments illustrated in the accompanying drawings. In the drawings, FIGURE 1 presents a schematic view showing a poultry house equipped with ventilation systems embodying this invention.

Figure 2:
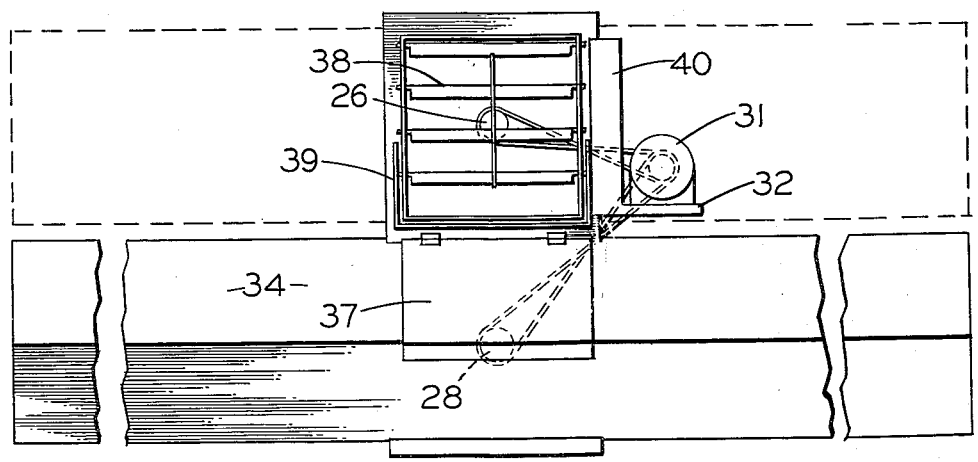

FIGURE 2 presents a view on an enlarged scale of the ventilation system described herein, and taken from the inside of the poultry house.

Figure 3:
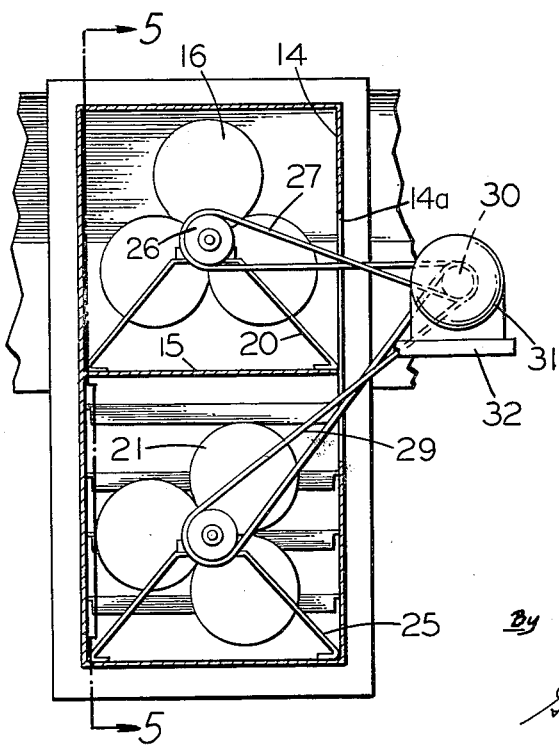

FIGURE 3 presents a sectional view through the housing from a position similar to that of FIGURE 2.

FIGURE 4 presents a perspective view of the components of the ventilating unit, taken from the outside.

FIGURE 5 is a section taken on the plane 5—5 of FIGURE 3.

Referring to the drawings, the poultry house generally indicated at 10 is shown equipped with ventilating units 11 and 12. Each of these units is constructed as will be described in connection with the remaining figures of the drawings.

The wall structure 13 of the poultry house 10 is provided with an opening occupied by the housing 14, the housing having a cut-out 14a for receiving belts for the transmission of power. The housing has two portions isolated from each other by the panel 15. The upper fan 16 is mounted on the shaft 17 supported by the bearings 18 and 19 on the bracket 20 in the upper portion of the housing, and the lower fan 21 is similarly mounted on the shaft 22 rotating in the bearings 23 and 24 supported by the bracket 25. A driven pulley 26 receives power from the belt 27 to drive the shaft 17, and the driven pulley 28 is similarly provided to receive power from the belt 29. Both of the belts are connected to the double driving pulley 30 of the motor 31. The motor is mounted on a shelf 32 which may be considered as fixed with respect to the wall 13.

The lower portion of the housing (associated with the fan 21) is in communication with the triangular duct 33 formed by the panels 34 and 35 which are connected together at 36 to form the apex of a triangular cross-section. Both of the panels are connected to the wall, which forms the third side of the duct. An access door 37 in the panel 34 opens opposite the pulley 28 to provide access for reversing the belt 29. The triangular duct is open at its opposite ends, and serves to isolate the flow of air induced by the fan 21 from that induced by the fan 16 when the fans are running in opposite directions. On the inside of the wall, the passage in the housing associated with the fan 16 is provided with the hinged louvers 38 which open under the influence of air movement. A deflector unit 39 is also provided, and is positioned by the strip 40 to control the direction of the admission of air to the interior of the building. This deflector causes the incoming air to move out horizontally into the room, rather than follow a short return path close to the ventilator.

On the outside of the building, an arrangement is provided which is approximately the reverse of that on the inside, as far as the use of the louvers and duct is concerned. A triangular duct 41 with an access door 42 is associated with the upper portion of the housing, with the louver unit 43 being mounted opposite the lower fan. A rain shield 44 is provided on the outside, however, for obvious reasons.

The particular embodiments of the present invention which have been illustrated and described herein are for illustrative purposes only and are not to be considered as a limitation upon the scope of the appended claims. In these claims, it is my intent to claim the entire invention disclosed herein, except as I am limited by the prior art.

I claim:

1. A ventilating system for a building having a wall provided with an opening therein, said system comprising; first and second fan means disposed one above the other and on axes of rotation substantially perpendicular to said wall, and mounted on said wall in said opening, and disposed to induce airflow through said opening; motor means mounted on said wall and having an axis of rotation parallel to the axes of rotation of said first and second fan means, said motor means including a driving pulley having at least two driving portions; a driven pulley on each of said first and second fan means for receiving power from said motor means; belt means connecting each of said driven pulleys with one driving portion of said driving pulley; housing means for said first and second fan means isolating the same from each other, said housing means having an opening for accommodating said belt means, said housing means also having an access door disposed adjacent at least one of said driven pulleys; and open-ended duct means on the inside and outside of said wall, respectively, extending laterally from said housing in opposite directions and communicating respectively with the portion of said housing associated with one of said fan means, said duct means being each triangular in cross section and formed by a pair of panels connected to said wall, said panels being connected to form the apex of said triangular cross-section.

2. A ventilating system for a building having a wall provided with an opening therein, said system comprising: first and second fan means having parallel axes of rotation and mounted on said wall in said opening, and disposed to induce airflow through said opening; motor means mounted on said wall and having an axis of rotation parallel to the axes of rotation of said first and second fan means, said motor means including a driving pulley having at least two driving portions; a driven pulley on each of said first and second fan means for receiving power from said motor means; belt means connecting each of said driven pulleys with one driving portion of said driving pulley; housing means for said first and second fan means isolating the same from each other, said housing means having an opening for accommodating said belt means, said housing means also having an access door disposed adjacent at least one of said driven pulleys; and open-ended duct means extending laterally from said housing in opposite directions and communicating with the portion of said housing associated with one of said fan means, said duct means being triangular in cross section and formed by a pair of panels connected to said wall, said panels being connected to form the apex of said triangular cross-section.

References Cited in the file of this patent

UNITED STATES PATENTS

| | | |
|---|---|---|
| 574,619 | Miller | Jan. 5, 1897 |
| 1,138,470 | Hackney | May 4, 1915 |
| 1,153,067 | Hackney | Sept. 7, 1915 |
| 1,929,776 | Faber | Oct. 10, 1933 |
| 2,014,840 | Geiger | Sept. 17, 1935 |
| 2,126,497 | Parsons | Aug. 9, 1938 |
| 2,164,608 | Cornelius | July 4, 1939 |
| 2,212,050 | Samuelson et al. | Aug. 20, 1940 |
| 2,620,126 | Lyne | Dec. 2, 1952 |
| 2,729,389 | Koch | Jan. 3, 1956 |
| 2,787,207 | Moore | Apr. 2, 1957 |